(12) United States Patent
Ota

(10) Patent No.: US 7,938,602 B2
(45) Date of Patent: May 10, 2011

(54) THREE DEGREE OF FREEDOM PARALLEL MECHANISM, MULTI-AXIS CONTROL MACHINE TOOL USING THE MECHANISM AND CONTROL METHOD FOR THE MECHANISM

(75) Inventor: Hiromichi Ota, Kariya (JP)

(73) Assignee: JTEKT Corporation, Osaka-shi (JP)

( * ) Notice: Subject to any disclaimer, the term of this patent is extended or adjusted under 35 U.S.C. 154(b) by 1086 days.

(21) Appl. No.: 11/687,764

(22) Filed: Mar. 19, 2007

(65) Prior Publication Data

US 2007/0248428 A1 Oct. 25, 2007

(30) Foreign Application Priority Data

Mar. 31, 2006 (JP) ................................. 2006-099991
Mar. 31, 2006 (JP) ................................. 2006-100002

(51) Int. Cl.
*B23C 1/12* (2006.01)
*B25J 9/00* (2006.01)

(52) U.S. Cl. ..... 409/216; 409/201; 409/235; 74/490.07; 74/490.03

(58) Field of Classification Search ................... 409/201, 409/211, 216, 235; 74/479.01, 490.01, 490.03, 74/490.05, 490.06, 490.07, 490.1; 408/234, 408/236–237; 451/236
See application file for complete search history.

(56) References Cited

U.S. PATENT DOCUMENTS

| | | | |
|---|---|---|---|
| 5,715,729 A * | 2/1998 | Toyama et al. ............. | 74/490.03 |
| 6,048,143 A * | 4/2000 | Chang et al. .................. | 409/201 |
| 6,099,217 A * | 8/2000 | Wiegand et al. .............. | 409/201 |
| 6,431,802 B1 | 8/2002 | Wahl | |
| 2004/0082284 A1 * | 4/2004 | Lutz et al. ..................... | 409/235 |
| 2004/0086351 A1 * | 5/2004 | Kim et al. ..................... | 409/235 |
| 2005/0064800 A1 | 3/2005 | Yoshimi et al. | |
| 2008/0193241 A1 * | 8/2008 | Huang et al. .................. | 409/216 |
| 2008/0214374 A1 * | 9/2008 | Sugiyama et al. ............. | 483/54 |

FOREIGN PATENT DOCUMENTS

EP 1 245 349 A1 10/2002

(Continued)

OTHER PUBLICATIONS

Philipp Last, et al., "Self Calibration of the Hexa-Parallel-Structure", Proceedings of the 2005 IEEE International Conference on Automation Science and Engineering Edmonton, XP-010834961, Aug. 1 and 2, 5005, pp. 393-398.

(Continued)

*Primary Examiner* — Erica E Cadugan
(74) *Attorney, Agent, or Firm* — Oblon, Spivak, McClelland, Maier & Neustadt, L.L.P.

(57) ABSTRACT

In a three degrees of freedom parallel mechanism, a spindle head is carried by first and second movable support members to be movable along a Z-axis and to be pivotable along each of A and B-axes. The spindle head is jointed through three rods to drive sliders which are movable along three parallel linear guides secured stationarily. For jointing, there are employed spherical joints and universal joints. Kinematic parameters used in converting each command position of the movable body to target operational positions for three actuators of the Z, A and B-axes are compensated based on inversely converted command positions and inversely converted actually measured positions which have been gathered with the spindle head being located at positions of a suitable number, so that the kinematic parameters can be updated to those newest.

14 Claims, 10 Drawing Sheets

FOREIGN PATENT DOCUMENTS

| | | |
|---|---|---|
| EP | 1 637 277 A1 | 3/2006 |
| EP | 1 775 077 A2 | 4/2007 |
| JP | 11-10575 | 1/1999 |
| JP | 2002-263973 | 9/2002 |
| WO | WO 2006/089887 A2 | 8/2006 |

OTHER PUBLICATIONS

Pierre Renaud, et al., "Combining end-effector and legs observation for kinematic calibration of parallel mechanisms", Proceedings of the 2004 IEEE International Conference on Robotics & Automation, 2004, vol. 14, XP-010769180, Apr. 26, 2004, pp. 4116-4121.

Gürsel Alici, et al., "Kinematic Identification of a Closed-Chain Manipulator Using a Laser Interferometry Based Sensing Technique", Proceedings of the 2003 IEEE/ASME International Conference on Advanced Intelligent Mechatronics(AIM 2003), vol. 1, XP-010654500, Jul. 20, 2003, pp. 332-337.

K. Takamasu, et al., Calibration of Three Dimensional Mechanism-Novel Calibration Method for 3DOF Parallel Mechanism-, IEEE ICIT'02, vol. 1, XP-010637338, Dec. 11, 2002, pp. 394-398.

Gao Meng, et al., "Calibration Method and Experiment of Stewart Platform Using a Laser Tracker", 2003 IEEE International Conference on Systems, Man and Cybernetics. SMC'03., vol. 5 of 5, XP-010668043, Oct. 5, 2003, pp. 2797-2802.

* cited by examiner

First Prior Art

Second Prior Art

Third Prior Art

THREE DEGREE OF FREEDOM PARALLEL MECHANISM, MULTI-AXIS CONTROL MACHINE TOOL USING THE MECHANISM AND CONTROL METHOD FOR THE MECHANISM

INCORPORATION BY REFERENCE

This application is based on and claims priority under 35 U.S.C. 119 with respect to Japanese Applications No. 2006-099991 and No. 2006-100002 both filed on Mar. 31, 2006, the entire contents of which are incorporated herein by reference.

BACKGROUND OF THE INVENTION

1. Field of the Invention

The present invention relates to a parallel mechanism for moving and positioning a spindle head or a work table of a machine tool with three degrees of freedom and a control method for the mechanism. In particularly, it relates to a three degree of freedom parallel mechanism and a control method for the mechanism which are suitable for the application to a milling machine for machining aircraft parts or components.

2. Discussion of the Related Art

As parallel mechanisms of this kind, there has been known one which is disclosed in U.S. Pat. No. 6,431,802 and shown in FIG. 10 of the present application. The known mechanism (hereafter referred to as first prior art) is designed to parallel drive a spindle head 12 by three carriages 3 which are driven respectively by three ball screws 5 in a Z-axis direction. The three carriages 3 and the spindle head 12 are jointed by three jointing rods (8, 9). Joint means between the carriages 3 and the jointing rods 8 are constituted by respective pins 10 perpendicular to the Z-axis, while joint means between the spindle head 12 and the carriages 3 are constituted by respective universal joints 11. This mechanism is advantageous because of being simple. However, the position and orientation of the spindle head 12 are detected and controlled at the locations of the three carriages 3 which are far away from the spindle head 12, whereby dimensional errors in machining the components such as the jointing rods 8, 9 and the like lead directly to errors in positioning. Further, another problem arises in that errors due to thermal deformation of the jointing rods 8, 9 and the like are unable to compensate. Motion control with these errors being left gives rise to a further problem that deterioration takes place in positioning error as well as in controllability (responsiveness) in positioning control. Furthermore, because of jointing by the pins 10, in other words, because the sum of the degrees of freedom at opposite ends of each jointing rod 8 or 9 is four and less than five, there arises a further problem that each jointing rod 8 or 9 suffers from a bending stress to weaken the mechanism in rigidity.

A mechanism shown in FIG. 11 is also disclosed in European Patent No. EP 1,245,349B. In this mechanism (hereafter referred to as second prior art), sliders 4 are respectively guided along three guide ways extending in a Z-axis direction, and a pair of arms 3 are jointed to each slider 4 so that six arms 3 support a head platform 5 corresponding to a spindle head. Spherical joints 6 and 7 are used for jointing each arm 3 with the head platform 5 and the associated slider 4. Because of using the spherical joints 6, 7, this apparatus does not have any bending stress acting on each arm 3 and thus, is high in rigidity. However, the position and orientation of the head platform 5 are detected and controlled at the locations of the sliders 4 which are far way from the head platform 5, whereby dimensional errors in machining the components such as the arms 3 and the like lead directly to errors in positioning, as is the case of the aforementioned first prior art. Another problem also arises in that it is unable to compensate for errors caused by the thermal deformation of the arms 3 and the like. Motion control with these errors being left gives rise to a further problem that deterioration takes place in positioning error as well as in controllability (responsiveness) in positioning control. An addition problem also arises in that a turn range for the head platform 5 has to be restricted to a small range for the purpose of obviating the interference of each pair of the adjacent arms 3 with the associated slider 4 and the associated guide way 2.

Another mechanism shown in FIG. 12 is disclosed in Japanese unexamined, published patent application No. 11-10575. In this mechanism (hereafter referred to as third prior art), a mast 1 for detecting the position and orientation of an end plate 6 is provided in addition to three links 7 and three ball screws 19, wherein the position and orientation of the mast 1 is detected in the neighborhood of a base plate 3. This mechanism is higher in position detection accuracy than the aforementioned two prior art mechanisms. However, because detections are made at a position away from the end plate 6, part dimensional errors in machining the mast 1 lead directly to errors in positioning, as is the case of the aforementioned two prior art mechanisms. Another problem also arises in that it is unable to compensate for errors caused by the thermal deformation of the mast 1 and the like. Motion control with these errors being left gives rise to a further problem that deterioration takes place in positioning error as well as in controllability (responsiveness) in positioning control. In the device, the detected positions of the mast 1 along three axes (I, $\theta$, $\phi$) are inversely converted for feedback to command values to be given to respective actuators. Nevertheless, nothing can be done for countermeasures in the case that kinematic parameters for the inverse conversion functions differ from those which should be for the actual machine, due to errors in machining machine components or due to thermal deformation of the machine components.

In Japanese unexamined, published patent application No. 2002-263979, the assignee of the present application proposed a parallel mechanism of the type that holds a traveling plate by six rods, wherein the calibration for kinematic parameters are performed from calculated position information and measured position information. However, the mechanism is not designed to directly detect the position of the traveling plate because detectors for the present positions which make a base of the measured position information are composed of six motor position detection encoders and six angle sensors for detecting rotational angles of the respective rods. The mechanism uses twelve detectors for position detection and estimates the kinematic parameters for a five degree of freedom traveling plate, wherein a problem arises in that a large load is imposed on the calculation processing. Further, since the present position is detected at a place which is away from the traveling plate and is used as feedback information in control, there arises another problem that the errors involved in the kinematic parameters result in compounding the positioning errors and in degrading the controllability (responsiveness) in positioning control. A further problem arises in that the twelve detection axes used therein make the mechanism complicated in construction.

SUMMARY OF THE INVENTION

It is therefore a primary object of the present invention to provide an improved three degree of freedom parallel mechanism which is simple in construction, is essentially high in rigidity, is wide in the movable range for a movable body (spindle head) to turn angularly, and is essentially high in absolute accuracy in positioning.

Another object of the present invention is to provide an improved three degree of freedom parallel mechanism which is easy to calibrate kinematic parameters and is also easy to enhance the controllability (responsiveness) in feedback control.

A further object of the present invention is to provide an improved control method and device for a three degree of freedom parallel mechanism, capable of obviating errors in machining parts constituting the mechanism and errors due to the thermal deformation of the parts so that the parallel mechanism can be enhanced in positioning accuracy and can be improved in the controllability (responsiveness) in positioning control.

Briefly, according to a first aspect of the present invention, there is provided a three degree of freedom parallel mechanism, which comprises linear guides secured to a housing and extending in a Z-axis direction; a movable body; a movable body support structure guided by the linear guides to be movable along the linear guides in the Z-axis direction and supporting the movable body to be pivotable along each of A and B-axes which are respectively defined about two mutually intersecting pivot axes; and three actuators connected at their one ends to the housing and at their other ends to the movable body respectively through rod-like members for moving the movable body.

With the construction in the first aspect, respective one ends of the rods are jointed to output ends of the actuators, while respective other ends of the rods are jointed to the movable body. Thus, each of the rod-like members has stretch and compression forces acting thereon, but does not suffer from any bending stress, so that the parallel mechanism can advantageously be enhanced in mechanical rigidity. Further, since directly jointed to the movable body are only three rod-like members, there can be realized an advantage that the movable body such as, e.g., a tool spindle head, can have a wider range of pivotal movement without suffering from the interference with the linear guides. Further, since the movable body is carried by a movable body support structure which enables the movable body to be movable along the Z-axis and pivotable along each of the A and B-axes, the movements of the movable body along each axis can be directly detected by position detectors such as, e.g., encoders, so that position detections can be attained substantially without needs for conversion calculations. This results in further advantages that the absolute accuracy in positioning is essentially high and that the calibration of the kinematic parameters can be done easily.

In a second aspect of the present invention, there is provided a multi-axis numerical control machine tool, which comprises a base; a work table provided on the base for supporting a workpiece thereon; a column provided on the base, wherein the work table and the column are relatively movable on the base in an X-axis direction; a headstock mounted on the column to be movable in a Y-axis direction perpendicular to the X-axis direction; a spindle head mounted on the headstock; and a tool spindle rotatably supported in the spindle head for receiving a tool in one end thereof. The machine tool further comprises the three degree of freedom parallel mechanism constructed as set forth in the aforementioned first aspect and incorporated in the headstock for supporting the spindle head to be movable in an Z-axis direction perpendicular to both of the X-axis direction and the Y-axis direction and to be pivotable along each of the A-axis and the B-axis which are respectively defined about the X-axis and the Y-axis; and a numerical control device for controlling linear movements of the spindle head relative to the work table in three mutually perpendicular directions including the X-axis direction, the Y-axis direction and the Z-axis direction and for controlling pivotal movements of the spindle head relative to the headstock along each of two axes including the A-axis and the B-axis which are respectively defined about the X-axis and the Y-axis; wherein the headstock and the spindle head are respectively constituted by the housing and the movable body of the three degree of freedom parallel mechanism.

With the construction in the second aspect, three axes of Z, A and B of the parallel mechanism are added to two axes of X and Y, whereby the multi-spindle numerical control machine tool with five axes can be realized as, e.g., a milling machine or the like.

In a third aspect of the present invention, there is provided a control method for a three degree of freedom parallel mechanism which moves a movable body carried by three actuators with three degrees of freedom. The method comprises a command position inverse conversion step of inversely converting command positions of the movable body based on kinematic parameters to inversely converted command positions for the actuators; an actually measured position inverse conversion step of inversely converting actually measured positions of the movable body based on the kinematic parameters to calculate inversely converted actually measured positions of the actuators; a control step of feeding the inversely converted actually measured positions back to the inversely converted command positions to control the positions of the movable body; a storage step of storing plural sets of inversely converted command positions and plural sets of the inversely converted actually measured positions respectively corresponding to the plural sets of inversely converted command positions; a kinematic parameter identification step of identifying the kinematic parameters included in inverse conversion expressions for calculating the inversely converted command positions from the command positions, based on the stored plural sets of inversely converted command positions and the stored plural sets of inversely converted actually measured positions corresponding thereto; and a calibration step of compensating old kinematic parameters by the kinematic parameters which have been identified based on the stored plural sets of inversely converted command positions and the stored sets of inversely converted actually measured positions, at a predetermined calibration timing.

With the construction in the third aspect, since the kinematic parameter identification step is executed based on the plural sets of inversely converted command positions and the corresponding plural sets of inversely converted actually measured positions, the kinematic parameters can be identified to take into account not only design values but also errors involved in machining the components for the parallel mechanism. In addition, since the kinematic parameters are compensated or calibrated based on the inversely converted command positions and the corresponding inversely converted actually measured positions which are obtained at every moment, the control is executed in dependence on the present kinematic parameters which are accurate to cope with the thermal deformation of the mechanism components, so that the positioning can be done precisely. Moreover, since feedback control is executed on the basis of the positions which have been calculated by the use of more accurate, updated kinematic parameters, the controllability (responsiveness) in position control can be remarkably improved, thereby resulting in an advantage that the operational speed and the locus-follow accuracy can be enhanced.

In a fourth aspect of the present invention, there is provided a three degree of freedom parallel mechanism, which comprises a movable body carried with three degrees of freedom; three actuators connected to the movable body for moving the same; a control device connected to the three actuators for controlling the three actuators to move the movable body with the three degrees of freedom; and three movable body position detectors arranged on three axes corresponding to the three degrees of freedom or at positions which are on lines parallel to the three axes and which are in the neighborhood of the movable body, for detecting coordinate positions of the movable body in a three-axis coordinate system corresponding to the three degrees of freedom. The control device comprises command position inverse conversion means for inversely converting command positions for three axes of the movable body based on kinematic parameters to calculate inversely converted command positions for the actuators; actually measured position inverse conversion means for inversely converting actually measured positions of the movable body, detected respectively by the three movable body position detectors, based on the kinematic parameters to calculate inversely converted actually measured positions of the actuators; control means for controlling the positions of the movable body by driving the three actuators while feeding the inversely converted actually measured positions back to the inversely converted command positions; position storage means for storing plural sets of the inversely converted command positions and plural sets of the inversely converted actually measured positions corresponding respectively thereto; kinematic parameter identification means for identifying the kinematic parameters included in inverse conversion expressions which calculate the inversely converted command positions from the command positions, based on the plural sets of inversely converted command positions and the corresponding plural sets of inversely converted actually measured positions which are stored in the position storage means; and calibration means for compensating old kinematic parameters by the kinematic parameters which have been identified based on the stored plural sets of inversely converted command positions and the stored plural sets of inversely converted actually measured positions, at a predetermined calibration timing.

With the construction in the fourth aspect, since the three movable body position detectors for detecting the coordinate positions of the movable body are arranged at the positions close to the movable body, the thermal deformation and the like of the members between the movable body and the position detectors hardly cause position detection errors to occur, so that the more accurate position of the movable body can be detected to be used in feedback control. Thus, advantages can be obtained in that not only the positioning control becomes more accurate, but also the identified kinematic parameters become more accurate. In addition, the provision of the calibration means for compensating the old kinematic parameters makes it possible to execute the feedback control using the more accurate, updated kinematic parameters, whereby it can be attained advantageously that not only the responsiveness (quick-response capability) in control is excellent, but also the operation speed and the locus-follow accuracy are high.

BRIEF DESCRIPTION OF THE DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

DETAILED DESCRIPTION OF THE PREFERRED EMBODIMENTS

Figure 1:
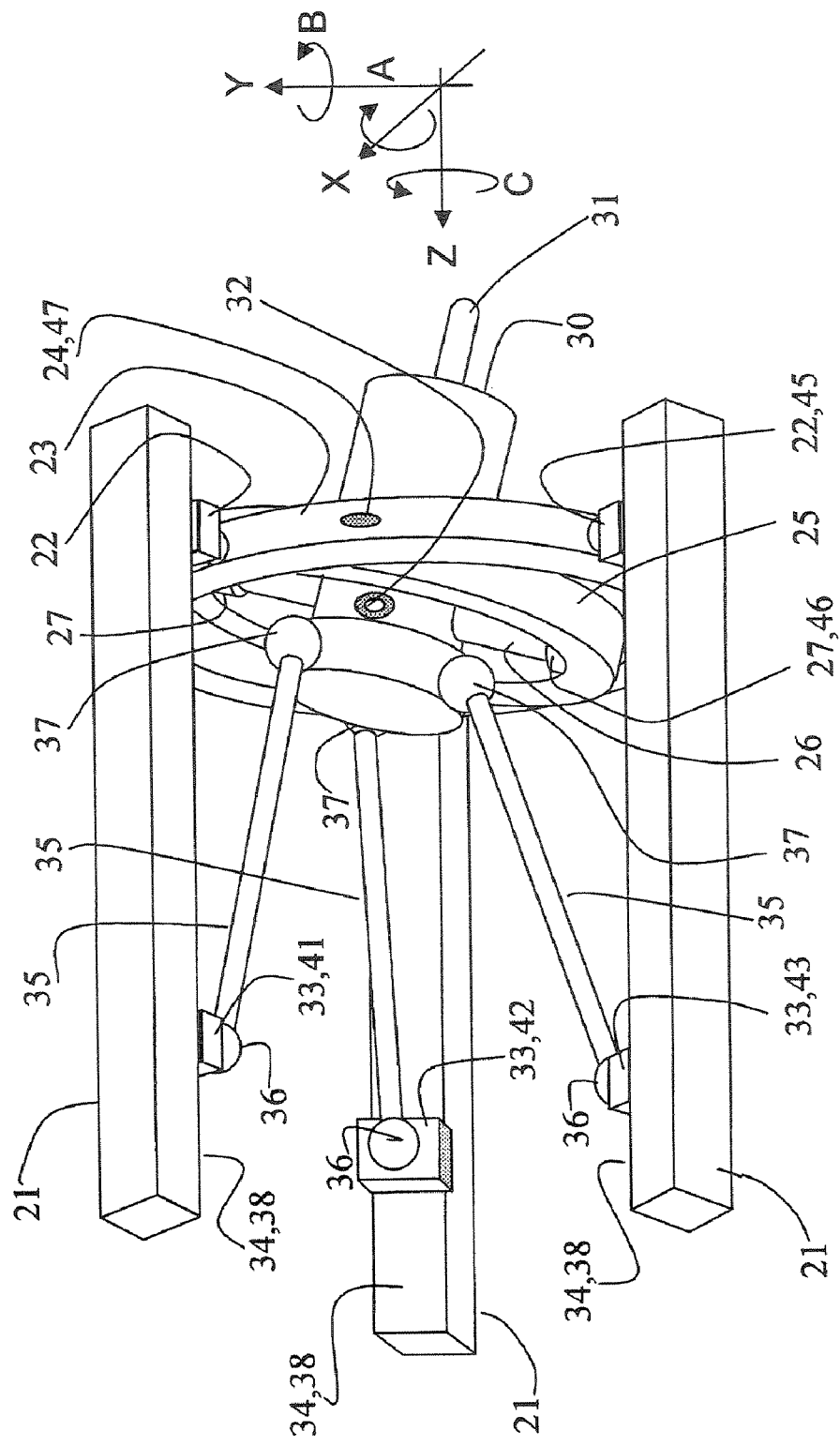
FIG. 1 is a perspective view of a three degree of freedom parallel mechanism in a first embodiment according to the present invention.

FIG. 1 is a perspective view of a three degree of freedom parallel mechanism in a first embodiment according to the present invention. Three linear guides 21 are secured to an internal surface of a cylindrical housing such as, e.g., that indicated at 94 in FIG. 9. The three linear guides 21 extend in parallel to one another in a Z-axis direction and are circumferentially arranged at equiangular intervals or at 120-degree intervals about an axis parallel to the Z-axis direction. Three follow sliders 22 are provided and guided along the three linear guides 21 to be movable in the Z-axis direction. An annular first movable support member 23 is secured to the three follower sliders 22. Thus, the first movable support member 23 is movable only in the Z-axis direction. A linear encoder 45 is built in one of the three follower sliders 22 to serve as Z-axis position detector for detecting the Z-axis position of the first movable support member 23.

A pair of pivot shafts 24 are provided on the first movable support member 23 to extend radially inward on an axis which extends in, e.g., an X-axis direction. The pivot shafts 24 define an A-axis thereabout and support a second movable support member 25 for pivotable movement along the A-axis. The second movable support member 25 is also an annular component. The pivotal position of the second movable support member 25 is detected by a rotary encoder 47 provided together with one of the pivot shafts 24. The rotary encoder 47 constitutes an A-axis position detector for detecting the position of the second movable support member 25 along the A-axis defined about the pivot shafts 24.

A pair of center pivot shafts 26 extend radially inward from an internal surface of the second movable support member 25 to pass across the center of the same in a direction perpendicular to the axis of the pivot shafts 24 which define the aforementioned A-axis thereabout. The center pivot shafts 26 are rotatably carried on the second movable support member 25 through respective rotary joints 27, 27. A rotary encoder 46 is built in one of the rotary joints 27 and detects the pivotal position of the center pivot shafts 26. The rotary encoder 46 built in the rotary joint 27 constitutes a B-axis position detector for detecting the pivotal position along a B-axis which is defined about an axis extending in, e.g., a Y-axis perpendicular to the X-axis. Thus, a movable body support structure is constituted by the aforementioned first movable support member 23, second movable support member 25, pivot shafts 24 and center pivot shafts 26.

A spindle head 30 is fixed on radially inner ends of the center pivot shafts 26. The spindle head 30 constitutes a movable body, which is linearly movable in the Z-axis direction and is pivotable along each of the A and B-axes. In other words, the spindle head 30 is prevented from being linearly moved in the Y-axis and the X-axis about which the aforementioned B and A-axes are defined respectively, and from being rotated along a C-axis which is defined about the aforementioned Z-axis. The spindle head 30 generally takes a cylindrical shape and rotatably carries a tool spindle (not shown) therein which is capable of removably receiving and securing thereto a machining tool 31 such as, end mill, grinding tool or the like, as well-known in the art. A spindle drive motor (not shown) is built in the spindle head 30 and drives the tool spindle together with the machining tool 31 for machining (cutting or grinding) a workpiece (not shown). Thus, the spindle head 30 is pivotable around the crossing point of the Y and X-axes which respectively define the B-axis and the A-axis thereabout and the tool spindle extends to across the crossing point in the Z-axis direction.

On the other hand, aside from the follower sliders 22, drive sliders 33 are arranged on the three linear guides 21 to be movable linearly. Each drive slider 33 is connected to an output end of a linear actuator 34 whose one end is secured to the associated linear guide 21, and is linearly movable in the Z-axis direction. An actuator axis servomotor 38 is built in each linear actuator 34. The respective drive sliders 33, 33, 33 and rear end portions of the spindle head 30 are jointed by respective rods 35, 35, 35. That is, each drive slider 33 and each rod 35 is jointed by a spherical joint 36 having three degrees of freedom, while each rod 35 and the spindle head 30 are jointed by a universal joint 37 having two degrees of freedom.

Here, symbols $U_1$, $U_2$ and $U_3$ respectively represent the position coordinates of the three drive sliders 33, 33, 33 in the Z-axis direction, and linear encoders 41-43 for detecting the position coordinates are respectively built in the drive sliders 33, 33, 33. Further, it is described earlier that the linear encoder 45 for detecting the Z-axis position of the spindle head 30 is built in one of the follower sliders 22, that the rotary encoder 46 for detecting the B-axis position coordinate is built in the rotary joint 27 and that the rotary encoder 47 for detecting the A-axis position coordinate is built in the pivot shaft 24. It is an advantage of the present embodiment that in this way, the positions (Z, A, B) of the spindle head 30 are directly detected by the respective position detectors 45, 46, 47 each constituted by an encoder. For this reason, the accuracy in detecting the present position of the spindle head 30 can be enhanced essentially.

Therefore, it can be realized to control the positions along the Z, A and B-axes of the spindle head 30 by driving the three linear actuators 34, 34, 34 to control the positions ($U_1$-$U_3$) of the three drive sliders 33, 33, 33 along the Z-axis. For example, when the three drive sliders 33, 33, 33 ($U_1$-$U_3$) are simultaneously moved by the same distance in the negative-going direction, the spindle head 30 is moved in the direction of $-Z$ with the posture or orientation thereof remaining as it is or unchanged. Further, when the drive slider 33 ($U_1$) on the linear guide 21 located on an upper side in the figure is advanced and when the drive sliders 33, 33 ($U_2$, $U_3$) on the linear guides 21, 21 located on a lower side in the figure are retracted at the same time, the spindle head 30 is turned along the A-axis (i.e., about the X-axis). Kinematic parameters P which are determined by the lengths of the rods 35, the jointing positions on the spindle head 30 and the like determine how the position and orientation of the spindle head 30 are changed in dependence on the positions ($U_1$-$U_3$) of the three drive sliders 33, 33, 33. In other words, the Z, A and B-axes positions of the spindle head 30 can be expressed by the function of the positions ($U_1$-$U_3$) of the three drive sliders 33, 33, 33 and the kinematic parameters P for the parallel mechanism.

Next, description will be made regarding inverse conversion expressions for calculating the positions ($U_1$-$U_3$) on the Z-axis of the three linear actuators 34, 34, 34 or the three drive sliders 33, 33, 33 from the coordinates (Z, A, B) of the spindle head 30.

Figure 2:
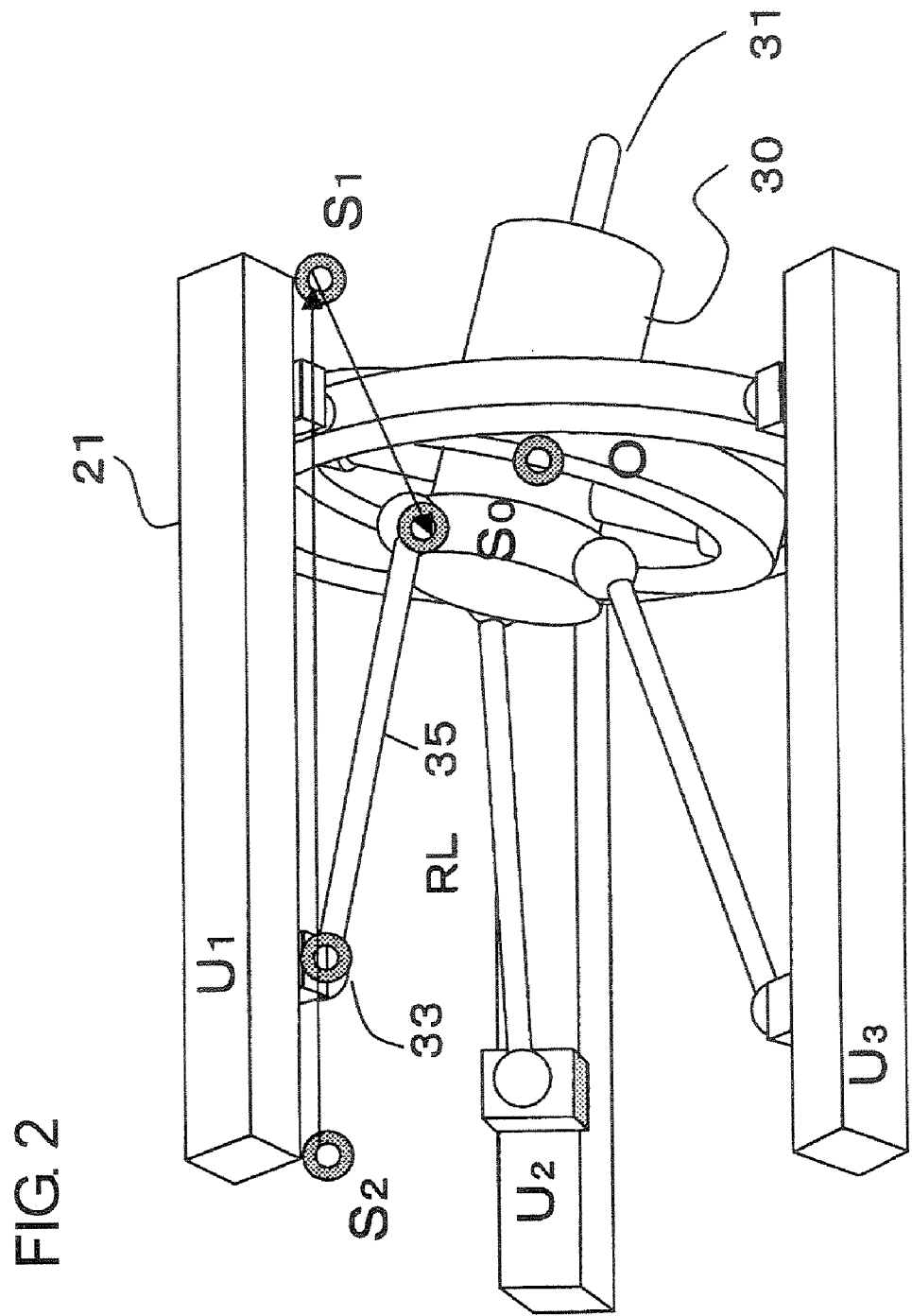
FIG. 2 is another perspective view of the three degree of freedom parallel mechanism, which view explains inverse conversion expressions for calculating the position $U_1$ of a drive slider located at an upper part of the figure.

FIG. 2 is a perspective view of the three degree of freedom parallel mechanism used in explaining the inverse conversion expressions for calculating the position $U_1$ of the drive slider 33 located on an upper side in the figure. The machining tool 31 is mounted on the spindle head 30. The coordinate of the pivotal center for the spindle head 30 is designated as symbol O. The jointing position of the rod 35 is $S_{OT}$ as viewed in a traveling plate coordinate system and is $S_O$ as viewed in a global coordinate system. Symbols $S_1$, $S_2$ and $U_1$ respectively denote the front end coordinate of the linear guide 21, the rear end coordinate of the linear guide 21 and the coordinate of the drive slider 33. The length of the rod 35 is denoted as RL.

The pivotal center coordinate O of the spindle head 30 is expressed by Expression 1.

$$O = \begin{bmatrix} 0 \\ 0 \\ z \end{bmatrix} \quad \text{[Expression 1]}$$

The jointing position $S_{OT}$ of the rod 35 as viewed in the traveling plate coordinate system is expressed by Expression 2.

$$S_{OT} = \begin{bmatrix} x_S \\ y_S \\ z_S \end{bmatrix} \quad \text{[Expression 2]}$$

Thus, the jointing position $S_O$ as viewed in the global coordinate system is expressed by Expression 3.

$$S_O = R[O + S_{OT}] \quad \text{[Expression 3]}$$

Here, symbol R is a matrix expressed by Expression 4.

$$R = \begin{bmatrix} \cos B & 0 & \sin B \\ 0 & 1 & 0 \\ -\sin B & 0 & \cos B \end{bmatrix} \begin{bmatrix} 1 & 0 & 0 \\ 0 & \cos A & -\sin A \\ 0 & \sin A & \cos A \end{bmatrix}$$ [Expression 4]

Taking the positions of opposite ends of the linear guide 21 respectively as $S_1$ and $S_2$ and applying the theorem of cosines to a triangle which is made by a side $S_O$-$S_1$, a side on the rod 35 and a side $S_1$-$U_1$ ($U_1$: position of the drive slider 33), the length RL of the rod 35 is expressed as Expression 5.

$$RL^2 = |S_{10}|^2 + U_1^2 + 2U_1 \frac{S_{21} \cdot S_{10}}{|S_{21}|}$$ [Expression 5]

$$(\because S_{21} = S_2 - S_1, \quad S_{10} = S_1 - S_0)$$

Here, the reason why the last cosine term is + (plus) is because $S_{21}=S_2-S_1$ is an inverse vector.

The following Expression 6 can be obtained by transforming Expression 5 for the actuator coordinate $U_1$.

$$U_1 = \frac{-S_{21} \cdot S_{10} + \sqrt{(S_{21} \cdot S_{10})^2 - |S_{21}|^2(|S_{10}|^2 - RL^2)}}{|S_{21}|}$$ [Expression 6]

Here, the actuator coordinate $U_1$ can be obtained as the function of the position X=(Z, A, B) of the spindle head 30 and hence, is expressed by Expression 7.

$$U_1 = f_1(X,P)$$ [Expression 7]

Here, the vector P expressed by the following Expression 8 is kinematic parameters which define the geometrical relation between the actuator positions $U_1$-$U_3$ and the position and orientation X=(Z, A, B) of the spindle head 30 and for example, is "kinematic parameters" indicating the length of the rod 35, the jointing position on the spindle head 30 and the position, angle and the like of the drive slide 33. Here, symbol "n" is the number of the kinematic parameters.

$$P=(P_1, P_2, \ldots, P_n)$$ [Expression 8]

Next, identification calculations or processing for the kinematic parameters will be described. The spindle head position $X_i$ is expressed by Expression 9.

$$X_i(i=1\ldots k)$$ [Expression 9]

Here, since "i" includes 1 to k, the spindle head positions at k-portions are expressed.

The inverse conversion expression for the actuator coordinates $U_1$-$U_3$ at a spindle head position Xi can be expressed by Expression 10.

$$\begin{cases} U_1 = f_1(X_i, P) \\ U_2 = f_2(X_i, P) \\ U_3 = f_3(X_i, P) \end{cases}$$ [Expression 10]

Then, by totally differentiating this expression for respective kinematic parameters, there can be obtained Expression 11.

$$\begin{cases} dU_{1i} = \frac{\partial f_1(X_i, P)}{\partial P_1}dP_1 + \frac{\partial f_1(X_i, P)}{\partial P_2}dP_2 + \ldots + \frac{\partial f_1(X_i, P)}{\partial P_n}dP_n \\ dU_{2i} = \frac{\partial f_2(X_i, P)}{\partial P_1}dP_1 + \frac{\partial f_2(X_i, P)}{\partial P_2}dP_2 + \ldots + \frac{\partial f_2(X_i, P)}{\partial P_n}dP_n \\ dU_{3i} = \frac{\partial f_3(X_i, P)}{\partial P_1}dP_1 + \frac{\partial f_3(X_i, P)}{\partial P_2}dP_2 + \ldots + \frac{\partial f_3(X_i, P)}{\partial P_n}dP_n \end{cases}$$ [Expression 11]

This results in obtaining the aforementioned expressions of k-sets for the spindle head positions of the number k. That is, inverse conversion expressions of the number 3k can be obtained for the spindle head positions of the number k. The number k of the spindle head positions is determined so that there can be obtained inverse conversion expressions of the number which is greater than the number n of the kinematic parameters (i.e., there becomes n≧3k). Expression 12 is obtained by expressing these in the form of a matrix.

$$\begin{bmatrix} dU_{11} \\ dU_{21} \\ dU_{31} \\ dU_{12} \\ dU_{22} \\ \vdots \\ dU_{3k} \end{bmatrix} =$$ [Expression 12]

$$\begin{bmatrix} \frac{\partial f_1(X_1, P)}{\partial P_1} & \frac{\partial f_1(X_1, P)}{\partial P_2} & \cdots & \frac{\partial f_1(X_1, P)}{\partial P_n} \\ \frac{\partial f_2(X_1, P)}{\partial P_1} & \frac{\partial f_2(X_1, P)}{\partial P_2} & \cdots & \frac{\partial f_2(X_1, P)}{\partial P_n} \\ \frac{\partial f_3(X_1, P)}{\partial P_1} & \frac{\partial f_3(X_1, P)}{\partial P_2} & \cdots & \frac{\partial f_3(X_1, P)}{\partial P_n} \\ \frac{\partial f_1(X_2, P)}{\partial P_1} & \frac{\partial f_1(X_2, P)}{\partial P_2} & \cdots & \frac{\partial f_1(X_2, P)}{\partial P_n} \\ \frac{\partial f_2(X_2, P)}{\partial P_1} & \frac{\partial f_2(X_2, P)}{\partial P_2} & \cdots & \frac{\partial f_2(X_2, P)}{\partial P_n} \\ \vdots & \vdots & \ddots & \vdots \\ \frac{\partial f_3(X_k, P)}{\partial P_1} & \frac{\partial f_3(X_k, P)}{\partial P_2} & \cdots & \frac{\partial f_3(X_k, P)}{\partial P_n} \end{bmatrix} \begin{bmatrix} dP_1 \\ dP_2 \\ dP_3 \\ dP_4 \\ dP_5 \\ \vdots \\ dP_n \end{bmatrix}$$

Expression 12 is rewritten to be expressed as Expression 13.

$$dU=JdP$$ [Expression 13]

Accordingly, the parameter errors dP become Expression 14 as a solution given by the least squares method.

$$dp=J^*dU$$ [Expression 14]

Here, symbol "J*" is a pseudo inverse matrix and is calculated by, e.g., Expression 15.

$$(J^*=(J^TJ)^{-1}J^T)$$ [Expression 15]

The technique of the least squares method is employed to calculate parameter errors dP. Thus, estimated values P1 of the kinematic parameters at the first time are calculated as expressed by Expression 16.

$$P_1 = P_0 + dp_0$$ [Expression 16]

Since the function f is nonlinear, the estimated values P1 calculated at the first time are taken as new kinematic parameters and then, the aforementioned calculations are repeated as Expressions 17, and convergent calculations are executed so that the parameter errors dP become less than a predetermined tolerable value $\epsilon$.

$$P_2 = P_1 + dp_1$$

$$P_3 = P_2 + dp_2$$ [Expression 17]

Figure 3:
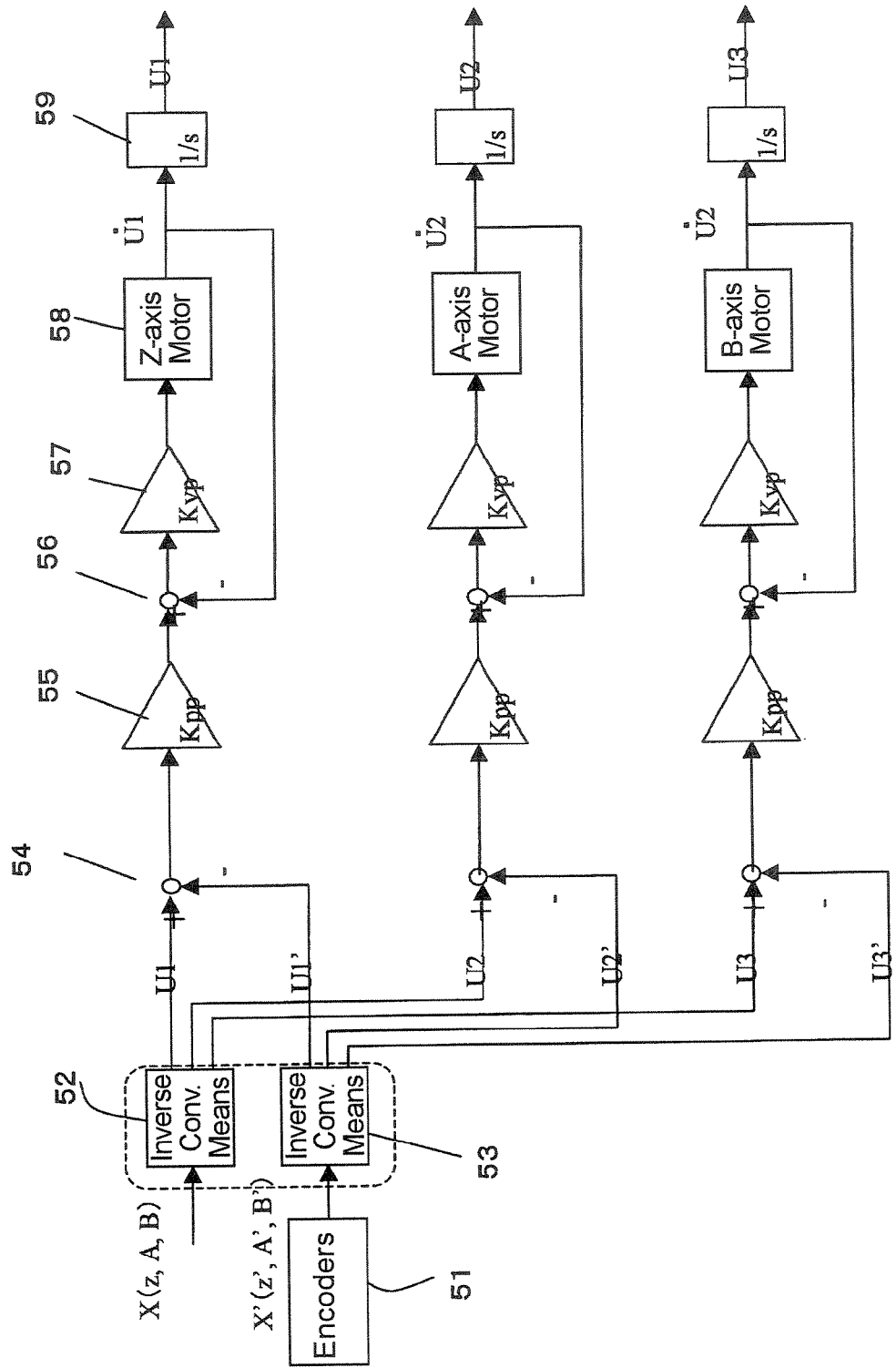
FIG. 3 is a block diagram of a control device which inversely converts a spindle head position (Z, A, B) into actuator positions ($U_1$, $U_2$, $U_3$) for feedback control.

FIG. 3 is a block diagram of a control device (preferably a computer numerical control device) for inversely converting each spindle head position (Z, A, B) into the actuator positions ($U_1$-$U_3$) and for performing feedback control. Each spindle head position command position X (Z, A, B) and encoder values X' (Z', A', B') from the respective encoders 51 (45, 46 and 47 shown in FIG. 1) are inversely converted by respective inverse conversion means 52, 53 to actuator coordinates U ($U_1$-$U_3$) and U' ($U_1'$-$U_3'$) respectively. The inversely converted command positions U and encoder values U' are inputted to adders 54 for subtraction on an axis-by-axis basis, and the differences are taken (i.e., feedbacks are made) to be outputted as position errors. The position errors are multiplied by position loop gains Kpp by respective position proportional gain amplifiers 55 to be outputted. The outputs from the position proportional gain amplifiers 55 are fed to adders 56 to take the differences from velocity outputs of the respective axes by being given velocity feedbacks. The outputs from the adders 56 are multiplied by velocity loop gains Kvp at respective velocity proportional gain amplifiers 57 and are fed to servo-amplifiers (not shown) to drive actuator axis servomotors 58 (those 38, 38, 38 in FIG. 1). The velocity outputs from the actuator axis servomotors 58 are fed back to the adders 56, respectively. The respective axes are moved by the outputs of the actuator axis servomotors 58, whereby the actuator axis encoder values $U_1$-$U_3$ change. That is, this is expressed as integral processing of the velocity outputs.

Figure 4:
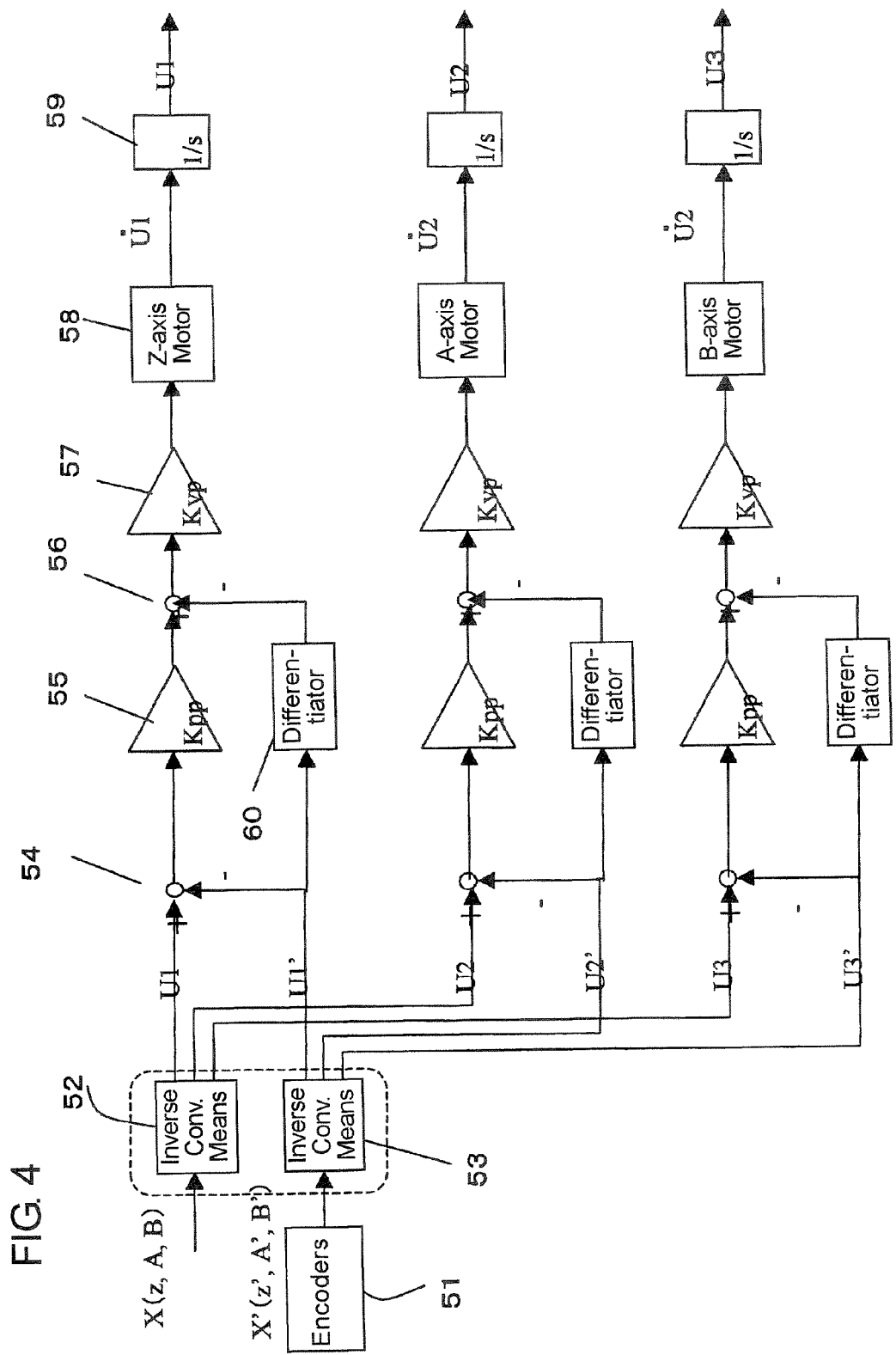
FIG. 4 is a block diagram of the control device in a modified form of the first embodiment according to the present invention.

FIG. 4 is a block diagram of the control device in a modified form. Components which are same as those in FIG. 3 are given the same reference numerals, and description of such same components is omitted for the sake of brevity. In the example shown in FIG. 3, the feedback information of the velocity loops are taken from the velocity outputs of the actuator axis servomotors 58. However, in this modified form, the velocity information is obtained by differentiating at differentiators 60 the inversely converted values U' of the spindle head position encoder values X' and is returned as velocity feedback values to the respective adders 56.

Although in the block diagrams shown in FIGS. 3 and 4, the adders 54, 56, the amplifiers 55, 57 and the like are illustrated and described as if they exist as hardware components, it is needless to say that the functions of these components can all be realized by the function of a MPU (microprocessor, not shown).

Figure 5:
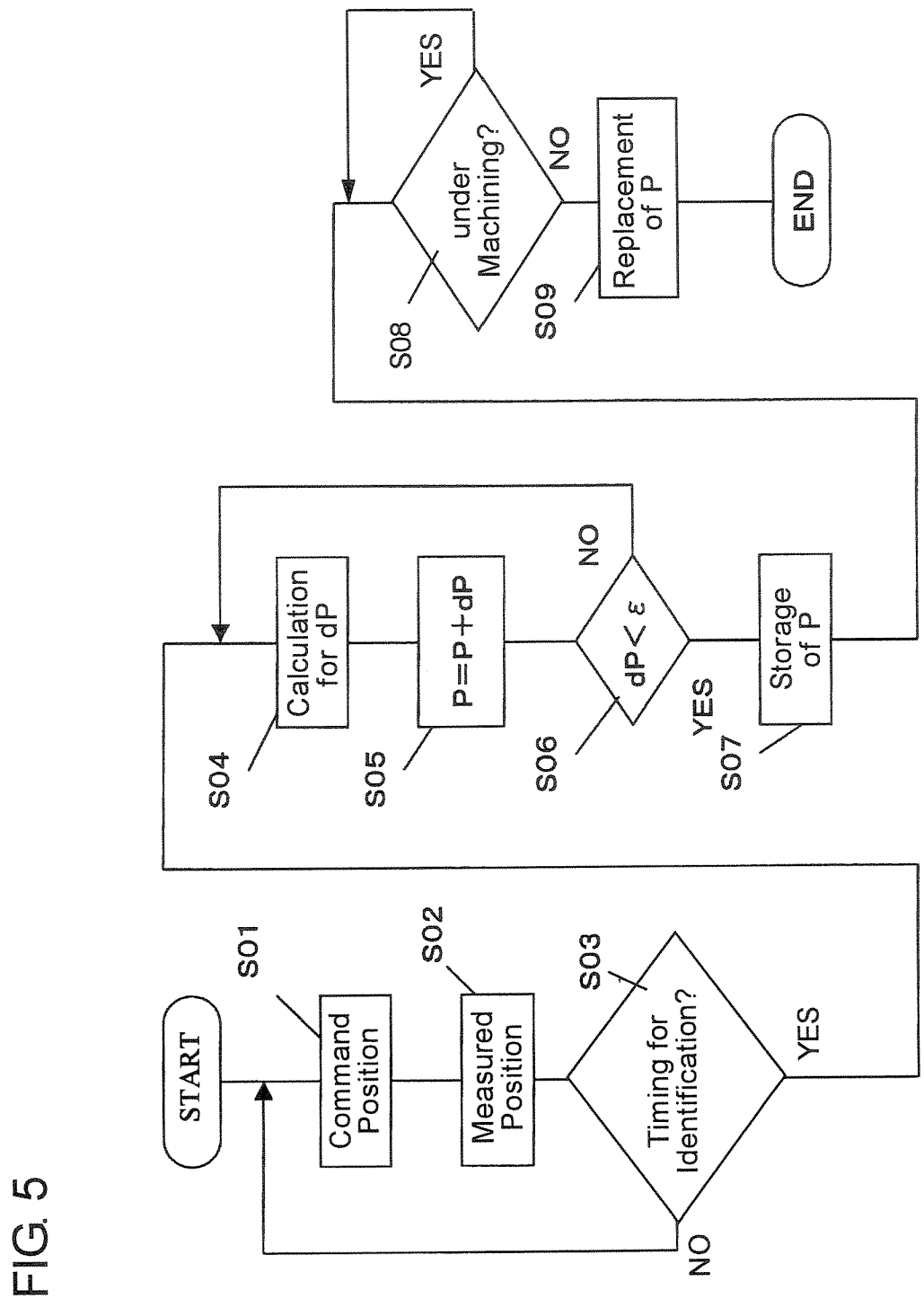
FIG. 5 is a flow chart showing a processing for performing steps to identify kinematic parameters.

FIG. 5 is a flow chart showing a program for executing the identification processing for the kinematic parameters P. Upon starting of the processing, first of all, the coordinate values (i.e., Z, A, B) of a commanded position at that time are stored at step S01. Then, at step S02, the encoder detection positions at that time are stored. Subsequently, at step S03, judgment is made of whether or not the present time is a time when the kinematic parameters are to be identified. The judgment of whether or not the time is when the identification is to be performed differs in dependence on the kinds or types of a machine tool to be used and a workpiece to be machined. For example, the judgment is performed when data of a certain quantity has been stored and cumulated or when the machining of several workpieces has been finished. If the judgment result is NO, return is made to step S01 to continue the accumulation or gathering of information, while if the judgment result becomes YES, the routine is advanced to step S04 to execute the identification processing of the kinematic parameters.

The parameter errors dP are calculated by Expression 14 at step S04. In calculating the parameter errors dP, the technique of the least squares method is used for the calculation from the information which is high in redundancy. Next, at step S05, the compensation or calibration of the kinematic parameters P is performed by adding the calculated parameter errors dP to the preceding kinematic parameters P. This is the processing by Expression 16. Then, at step S06, it is judged whether or not each parameter error dP is smaller than a tolerable value $\epsilon$. If the result of the judgment is NO because of being greater than or equal to the tolerable value $\epsilon$, return is made to step S04, wherein new parameter errors dP are calculated based on the compensated kinematic parameters P. Then, the calculated parameter errors dP are added to the preceding kinematic parameters P to compensate or calibrate the kinematic parameters P again. Steps S04 through S06 are repeated many times until each parameter error dP becomes smaller than the tolerable value $\epsilon$. These processing correspond to the convergence calculations using Expression 17.

When the parameter errors dP become smaller than the tolerable value $\epsilon$ as a result of the convergence calculations, step S07 is reached, wherein the converged new kinematic parameters P are stored. Next, step S08 is held to wait for the finish of machining a workpiece presently under machining. The reason of waiting for the finish of the machining is to avoid the probability that the changing of the kinematic parameters P during the machining of one workpiece would result in forming a tiny step on a finished surface of the workpiece. Upon completion of the machining, step S09 is reached, wherein the kinematic parameters P are updated to replace those old. Then, the identification processing is terminated. This processing is advantageous in that the gathering of the position information for identification is carried out during the machining operations of a machine tool, which incorporates the parallel mechanism as described later with reference to FIG. 9, so that thermal displacement of machine tool components during the machining operations can be taken into the kinematic parameters P.

The aforementioned processing from step S01 through S09 is programmed to accumulate or gather position information during the machining of the workpiece. In a modified form, the position information gathering may be performed in a non-machining state. More specifically, in the state that the machining is not performed, movable bodies such as the spindle head 30 and the like of the machine tool may be positioned at each of plural particular positions, and the identification of the kinematic parameters P may be carried out based on the position information which is gathered at such positioning. The plural particular positions include the combinations of Z=0, −100, −200 (unit: millimeters); A=−30, −15, 0, +15, +30 (unit: degrees); B=−30, −15, 0, +15, +30 (unit: degrees). The combinations create coordinates of 3×5×5=75, and this enables the inverse conversion expressions to gather position information of 75×3=225 sets. The identification of the kinematic parameters can be performed using these expressions. Usually, the number of the expressions is made to be greater than the number of the kinematic parameters, and the least squares method is utilized to minimize the influence by measured errors.

Figure 6:
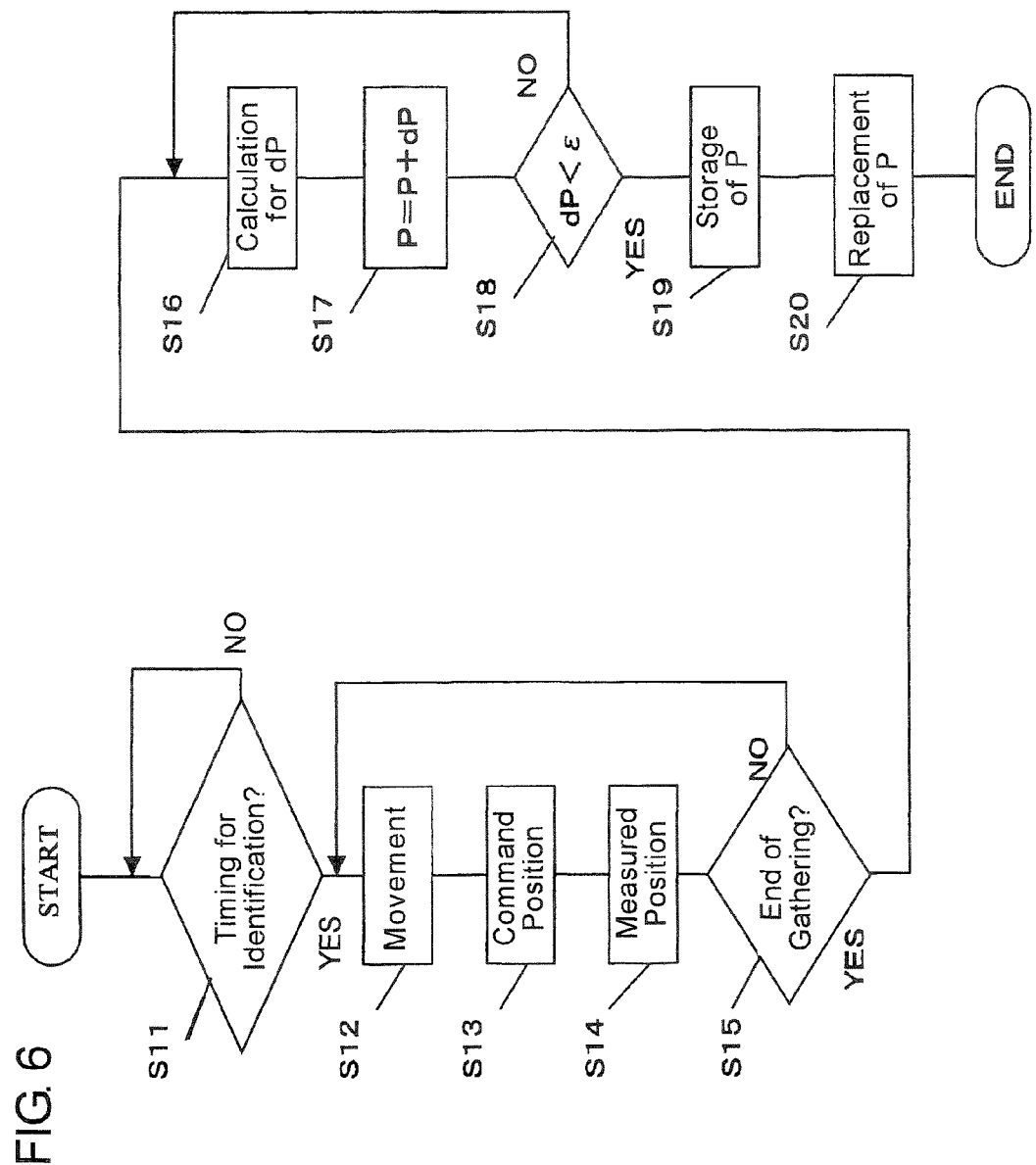
FIG. 6 is a flow chart of a processing for positioning the machine to plural particular positions necessary for identification of kinematic parameters and for identifying the kinematic parameters from position information which is given from encoders at each positioning.

FIG. 6 is a flow chart for positioning the machine to plural particular positions necessary for identification of kinematic parameters and for identifying the kinematic parameters from position information which is given from encoders at the respective positions. It is assumed that the aforementioned seventy-five (75) coordinates are used as the plural particular positions. At step S11, waiting is continued for the time to identify the kinematic parameters. As the time to identify the kinematic parameters, there may be chosen a time at which the machine tool begins to operate, a time at which a next kind of workpieces are to be machined subsequent to the completion of a certain kind of workpieces, or the like. At step S12, each axis is moved to a coordinate which is of the seventy-five coordinates and at which the measurement is to be performed next. Then, the commanded position for each axis (i.e., each of the Z, A and B-axes) is stored at step S13, and the measured position by each axis encoder is stored at step S14. Thereafter, judgment is made at step S15 of whether or not the gathering of the position information has been completed on all of the seventy-five coordinate positions to be identified. If the gathering has not been completed yet, return is made to step S12 to repeat the gathering of the identification information. Upon completion of the gathering, the routine is moved from step S15 to step S16.

Steps S16 through S19 are completely the same as steps S04 through S07 in FIG. 5. That is, errors of the kinematic parameters P are calculated the kinematic parameters P are compensated or calibrated, and convergence calculations are performed until the errors become less than the tolerable value $\epsilon$. Then, the compensated new kinematic parameters P are stored. Finally, at step S20, the preceding kinematic parameters P are replaced by the new kinematic parameters P, after which the processing is terminated. In this processing, the spindle head 30 is moved and positioned to positions to which it is seldom moved during ordinary machining, and the identification information is gathered with the spindle head 30 or the machine tool being well-balanced. Therefore, the processing is advantageous in that the convergence calculations can be made speedily.

Figure 7:
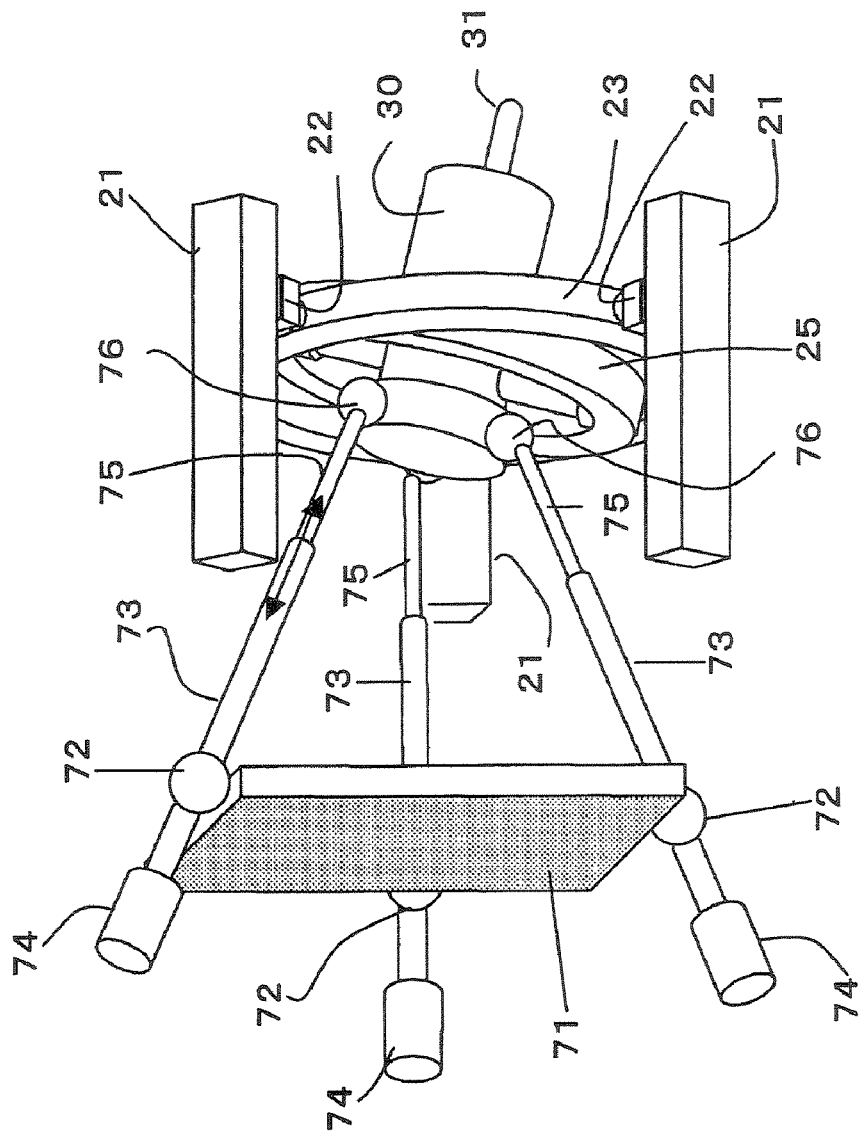
FIG. 7 is a perspective view of a three degree of freedom parallel mechanism in a second embodiment according to the present invention.

FIG. 7 is a perspective view of a three degree of freedom parallel mechanism in a second embodiment according to the present invention. Components which are the same as those in FIG. 1 are designated by the same reference numerals, and description of such components is omitted for the sake of brevity. In this embodiment, the position and orientation of the spindle head 30 are controlled not by the rods 35 but by three telescopic linear actuators 73. The three telescopic linear actuators 73 are attached to a platform 71 through universal joints 72 each having two degrees of freedom. The platform 71 is a part of a housing which is indicated at 94 in FIG. 9 for example or is a member bodily secured to the housing. Each telescopic linear actuator 73 is provided with a drive servomotor 74 with an encoder (not shown), and an output rod 75 of the actuator 73 is telescopically moved in dependence on the rotational position of the drive servomotor 74 with the encoder. The output rods 75 of the actuators 73 are connected to rear end portions of the spindle head 30 respectively through spherical joints 76 having three degrees of freedom. The position and orientation of the spindle head 30 are controlled by telescopically operating the three telescopic linear actuators 73. The present embodiment is advantageous in that the components for constructing the three degree of freedom parallel mechanism can be reduced in number.

Figure 8:
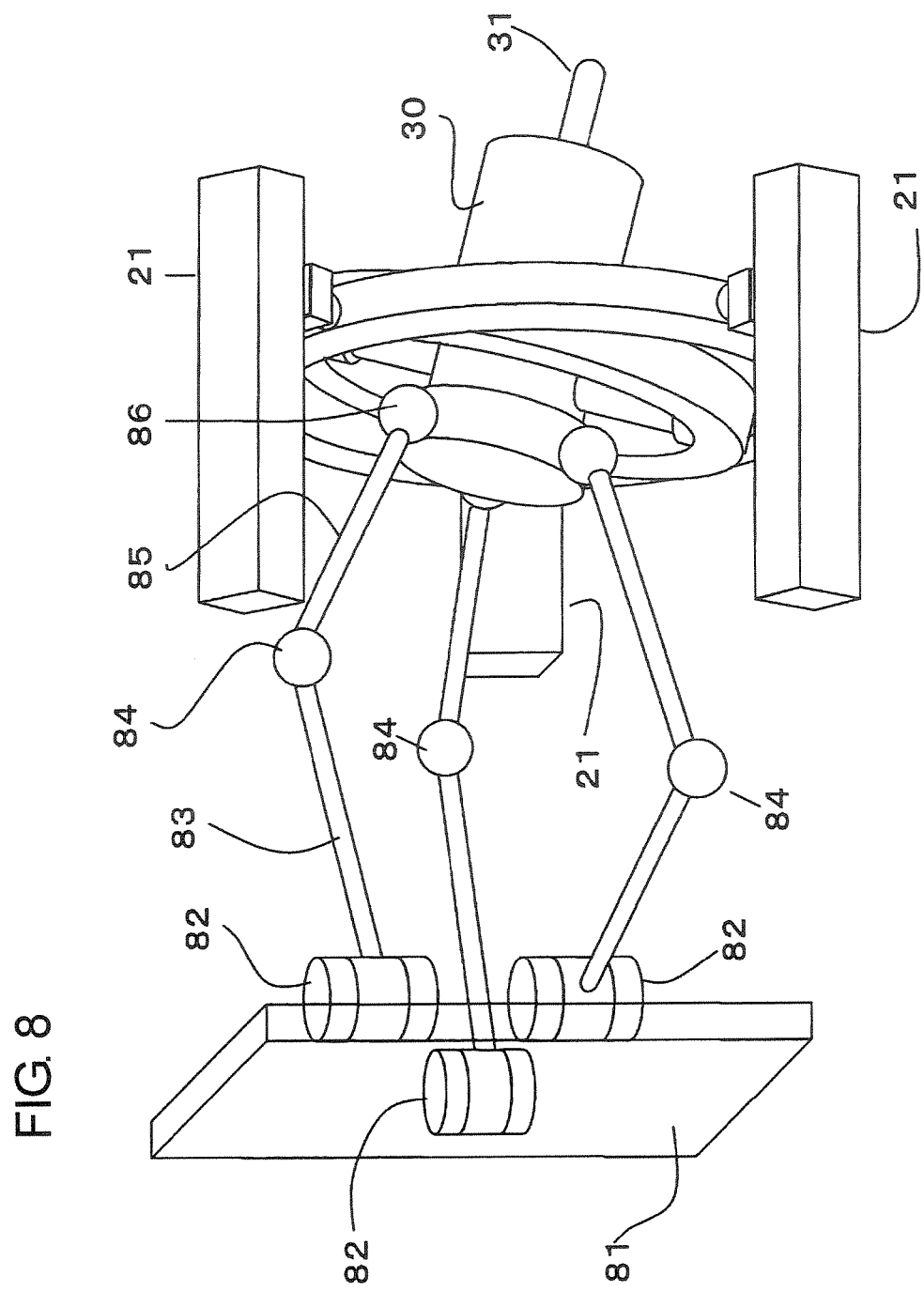
FIG. 8 is a perspective view of a three degree of freedom parallel mechanism in a third embodiment according to the present invention.

FIG. 8 is a perspective view of a three degree of freedom parallel mechanism in a third embodiment according to the present invention. Components which are the same as those in FIG. 1 are designated by the same reference numerals, and description of such components is omitted for the sake of brevity. In this embodiment, three rotary actuators 82 are attached to a platform 81, which is a part of a housing which is indicated at 94 in FIG. 9 for example or is a member bodily secured to the housing. Each rotary actuator 82 has built therein a rotary encoder for detecting the rotational position of the rotary actuator 82. A first lever 83 is secured to an output end of each rotary actuator 82 to be pivotable bodily with the same. A universal joint 84 having two degrees of freedom is jointed to an end of each first lever 83, and a second lever 85 is connected to the universal joint 84. The second levers 85 are jointed to rear end portions of a spindle head 30 respectively through spherical joints 86 each having three degrees of freedom. The position and orientation of the spindle head 30 are controlled by driving the three rotary actuators 82 to turn the three first levers 83. The present embodiment is advantageous in that it can be realized to construct the three degree of freedom parallel mechanism by the use of the rotary actuators 82.

Figure 9:
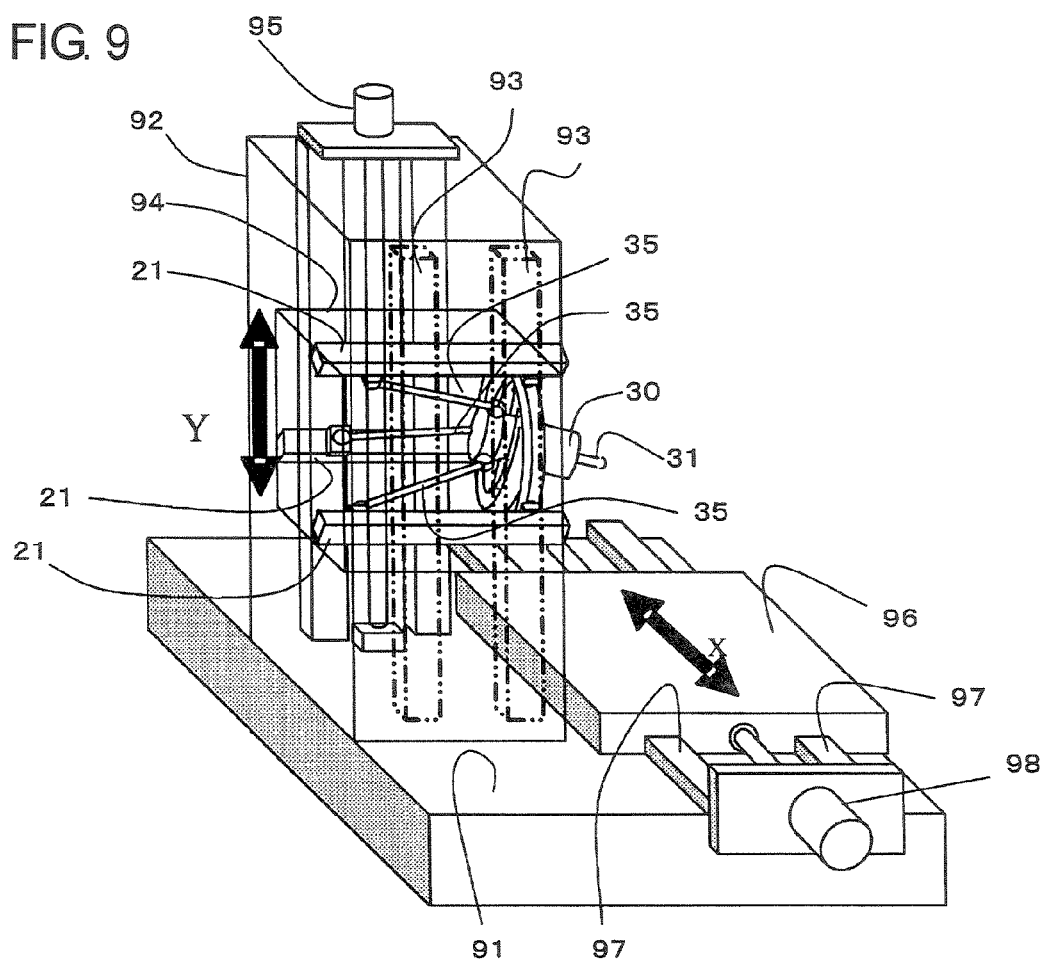
FIG. 9 is a perspective view of a horizontal milling machine incorporating the three degree of freedom parallel mechanism in the first embodiment shown in FIG. 1, with several parts therein being illustrated transparently.
Figure 10:
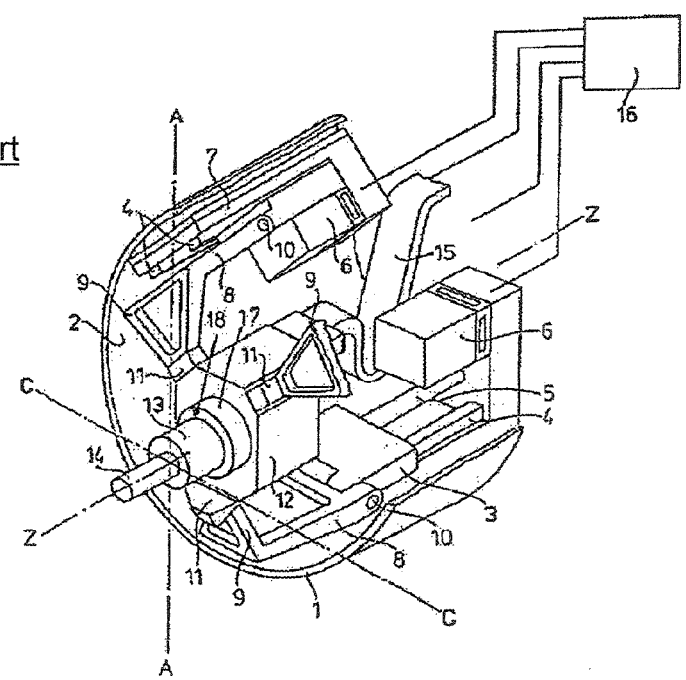
FIG. 10 is a perspective view partly in section of first prior art.
Figure 11:
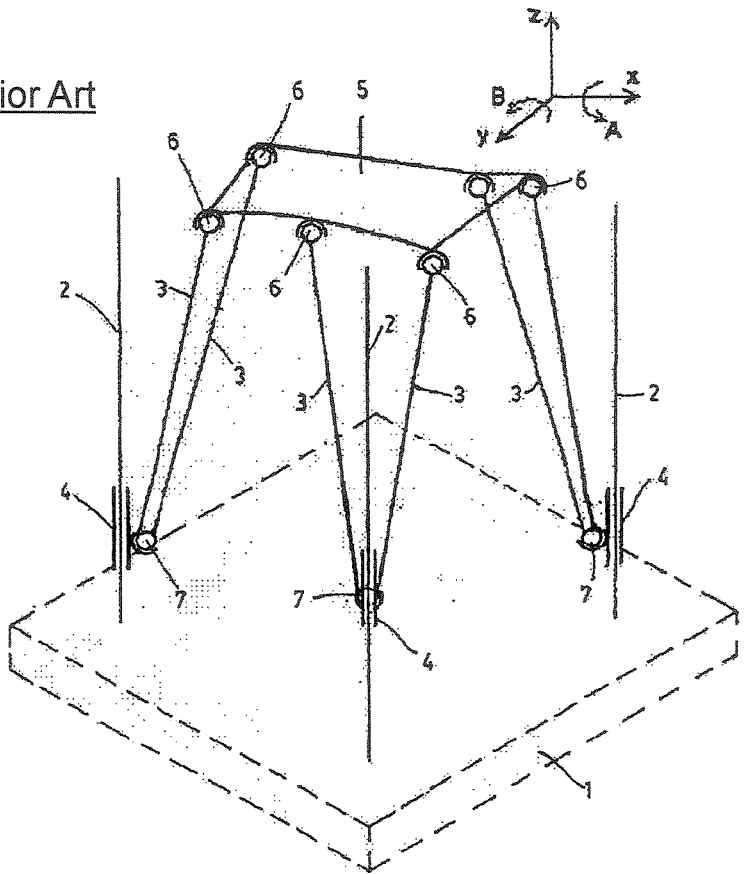
FIG. 11 is a perspective view of second prior art.
Figure 12:
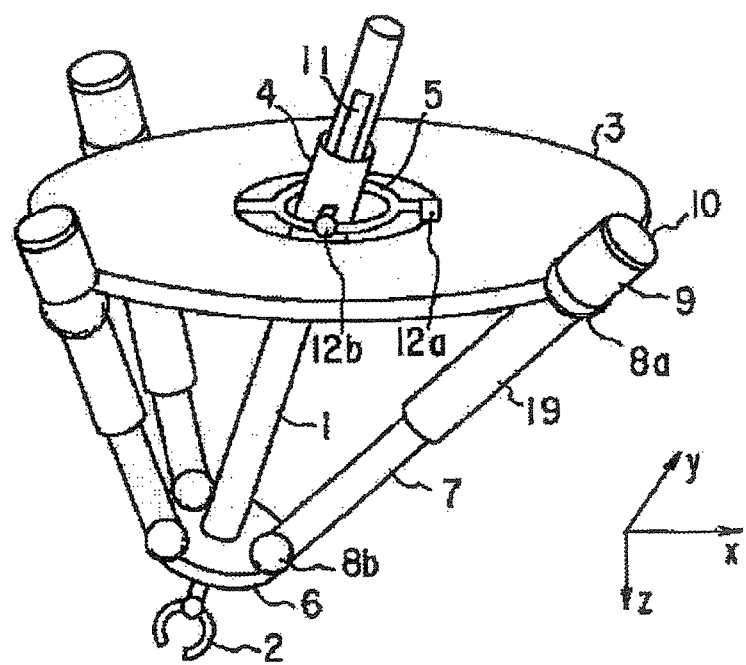
FIG. 12 is a perspective view of third prior art.

FIG. 9 is a perspective view of a horizontal milling machine incorporating the three degree of freedom parallel mechanism which has been described in the first embodiment with reference to FIG. 1, with several parts in the figure being illustrated transparently. A column 92 is provided upright on a bed or base 91. A headstock 94, referred to earlier as housing, is guided on a pair of guides 93, 93 which are provided on the column 92 to extend in the Y-axis direction, and is movable in the Y-axis direction. The headstock 94 is controllably driven by a Y-axis servomotor 95. The three degree of freedom parallel mechanism which has been described earlier with reference to FIG. 1 is incorporated in the headstock 94. That is, the three linear guides 21 are fixed on the headstock 94. The three rods 35 are operated by the drive sliders 33 guided on the linear guides 21 and driven by the linear actuators 34, and the position (Z, A, B) of the spindle head 30 and the distal end of the tool 31 are controllable by the three rods 35.

Further, a work table 96 is mounted on the base 91, and a pair of guides 97, 97 extending in the X-axis direction slidably guide a work table 96 in the X-axis direction. The table 96 is controllably driven by an X-axis servomotor 98. Accordingly, the machine tool is constructed as a machine tool which is controllable along five control axes including X, Y, Z, A and B.

Various features and many of the attendant advantages in the foregoing embodiments will be summarized as follows:

In the parallel mechanism in the foregoing first embodiment typically shown in FIG. 1, respective one ends of the rods 35 are jointed to output ends of the actuators 34, while respective other ends of the rods 35 are jointed to the movable body 30. Thus, each of the rods 35 has stretch and compression forces acting thereon, but does not suffer from any bending stress, so that the parallel mechanism can be advantageously enhanced in mechanical rigidity. Further, since directly jointed to the movable body 30 are only three rods 35, there can be realized an advantage that the movable body 30 such as, e.g., a tool spindle head, can have a wider range of pivotal movement without suffering from the interference with the linear guides 21. Further, since the movable body 30 is carried by a movable body support structure 22-26 which enables the movable body 30 to be movable along the Z-axis and to be pivotable along each of the A and B-axes, the movements of the movable body 30 along each axis can be directly detected by position detectors 45-47 such as, e.g., encoders, so that position detections can be attained with the calculation for conversion being hardly needed. This results in further advantages that the absolute accuracy in positioning is essentially high and that the calibration of the kinematic parameters can be done easily.

Also in the parallel mechanism in the foregoing first embodiment typically shown in FIG. 1, the three movable body position detectors 45-47 are provided to detect the position of the movable body 30, and the position and orientation (those positions along the Z, A and B-axes) of the movable body 30 can be detected directly, so that it can advantageously be realized to heighten the positioning accuracy as well as the controllability (responsiveness).

Also in the parallel mechanism in the foregoing first embodiment typically shown in FIG. 1, the first and second movable support member 23, 25 constitute a universal joint which is carried to be movable in the Z-axis direction. Thus, the mechanism can be structured to be movable in each of the three axes including the Z, A and B-axes and to be highly rigid in any other directions. Additionally, it can advantageously become easier to directly detect the positions on the three axes including the Z, A and B-axes.

Also in the parallel mechanism in the foregoing first embodiment typically shown in FIG. 1, the three actuators comprises linear actuators 34 for moving the three drive sliders 33 in the Z-axis direction, the three drive sliders 33 are jointed to the movable body 30 respectively through the three rods 35, and the joint 36 provided on one end of each rod 35 is a joint with three degrees of freedom while the joint 37 on the other end is a joint with two or more degrees of freedom. With this construction, each rod 35 becomes movable with five or more degrees of freedom and only has stretch and compression forces without suffering from any bending stress, so that the drive mechanism can advantageously be enhanced in rigidity. Thus, it does not take place that the kinematic parameters P are fluctuated due to the bending deformation of each rod 35, and this advantageously results in improving the controllability (responsiveness) of the three degree of freedom parallel mechanism.

Also in the parallel mechanism in the foregoing first embodiment typically shown in FIG. 1, the three movable body position detectors 45-47 are arranged at positions closer to the movable body 30 than the positions where the actuator position detectors 41-43 are arranged, and the feedback control means (FIG. 4 or 5) is provided to perform the feedback controls of the three actuators 34 based on the information from the three movable body position detectors 45-47. With this construction, since the three movable body position detectors 45-47 are arranged in the neighborhood of the movable body 30, distances from the movable body 30 to the movable body position detectors 45-47 are shortened, so that the positions along the three axes of the movable body 30 can be detected accurately. Thus, the actuators 34 and hence, the rods 35 can be controlled based on the accurate position information on the three axes including the Z, A and B-axes, so that there can be realized a three-axis feedback control which is accurate and improved in controllability.

Also in the parallel mechanism in the foregoing first embodiment typically shown in FIG. 1, the positions of the movable body 30 along the three axes (Z, A and B axes) can be directly detected by the movable body position detectors 45-47 on the respective axis.

Also in the parallel mechanism in the foregoing first embodiment typically shown in FIG. 1, the linear guides comprise three parallel linear guides 21, and the three actuators 34 are constructed bodily with the three linear guides 21 and drive the drive sliders 33 on the linear guides 21. With this construction, each linear guide 21 is shared by a part for guiding the movable support structure 22-26 in the Z-axis direction and another part for guiding the drive slider 33 in the Z-axis direction, so that the three degree of freedom parallel mechanism can advantageously simplified in construction.

Also in the parallel mechanism in the foregoing first embodiment typically shown in FIG. 1, the linear guides comprise three parallel linear guides 21 which are circumferentially arranged at equiangular intervals or 120-degree intervals about an axis parallel to the Z-axis, the first movable support member 23 is an annular member which is secured to the three linear sliders 22 guided along the three linear guides 21, the second movable support member 25 is an annular member pivotably carried by the pair of pivot shafts 24 which are provided to protrude radially inward from the first movable support member 23, and the movable body 30 is a head housing member pivotably carried by the pair of pivot shafts 26 which are provided to protrude radially inward from the second movable support member 25 perpendicularly to the pair of pivot shafts 24. With this construction, it becomes possible to provide a mechanism which enables the movable body 30 to be movable on each of three axes (Z, A and B-axes) and which is simple and has increased rigidity in any other axis directions. The equiangular arrangement makes even the forces imposed on the three linear sliders 21, so that the parallel mechanism can advantageously be well balanced.

Also in the parallel mechanism in the foregoing first embodiment typically shown in FIG. 1, since the three linear actuators 34 and the three rods 35 are arranged at equiangular intervals or 120-degree intervals about the axis in parallel to the Z-axis direction, the forces imposed on the three linear sliders 21 are made to be even with one another, so that the parallel mechanism can advantageously be well balanced.

Also in the parallel mechanism in the foregoing first embodiment typically shown in FIG. 1, the B-axis position detector 46 and the A-axis position detector 47 are arranged respectively on axes (Y and X-axes) which respectively define the B-axis and the A-axis thereabout and which intersect perpendicularly with each other, the Z-axis position detector 45 is arranged on a surface which includes an intersection point between the axes respectively defining the B-axis and the A-axis thereabout and which is perpendicular to the Z-axis direction, and the intersection point is adjacent to the axis of the movable body 30. Thus, it can be realized to detect the positions of the movable body 30 on each of three axes (Z, A and B-axes) more directly, so that the position control of the movable body 30 can be done precisely and easily.

Also in the parallel mechanism in the foregoing first embodiment typically shown in FIG. 1, since the spherical joint 36 with three degrees of freedom is used to joint each drive slider 33 to each rod 35, while the universal joint 37 with two or more degrees of freedom is used to joint each rod 35 to the movable body 30, the number of the freedoms at opposite ends of each rod 35 becomes five in total, so that it can be easily realized to make zero the bending moment imposed on each rod 35.

In the parallel mechanism in the foregoing second embodiment typically shown in FIG. 7 the three actuators comprises three telescopic linear actuators 73 whose respective one ends are jointed to three portions of the housing 71 respectively through the universal joints 72 and whose respective output ends are jointed to the movable body 30 respectively through the spherical joints 76. With this construction since the three telescopic linear actuators 73 play the functions of the rods 35 as used in the foregoing first embodiment without using the drive sliders 33 as used in the foregoing first embodiment, the three degrees of freedom parallel mechanism can be further simplified in construction.

In the parallel mechanism in the foregoing third embodiment typically shown in FIG. 8, the three actuators comprises three rotary actuators 82 secured to three portions of the housing 81, wherein three first link levers 83 are secured at respective one ends thereof to the output ends of the three rotary actuators 82 and wherein three second link levers 85 are respectively jointed at one ends thereof to the first link levers 83 through the universal joints 84 and at other ends thereof to the movable body 30 respectively through the spherical joints 86. With this construction, it can be realized to provide the three degrees of freedom parallel mechanism using the rotary actuators 82.

In the modified form of the foregoing first embodiment shown in FIG. 9, the multi-axis numerical control machine tool is realized by incorporating the three degree of freedom parallel mechanism constructed as described in the foregoing first embodiment into the headstock 94, wherein the parallel mechanism supports the spindle head 30 to be movable in the Z-axis direction perpendicular to both of the X-axis direction and the Y-axis direction and to be pivotable along each of the B-axis and the A-axis which are defined respectively about the Y and X-axes perpendicular to each other. Thus, it becomes possible to apply the multi-axis numerical control machine tool as a milling machine or the like.

Further, in the control method for a three degree of freedom parallel mechanism in the foregoing first embodiment typically shown in FIG. 5, since the identification step (S04-S06) of identifying the kinematic parameters P is executed based on the plural sets of inversely converted command positions (step S01) and the corresponding plural sets of inversely converted actually measured positions (S02), the kinematic parameters P can be identified to take into account not only design values but also errors dP involved in machining the components for the parallel mechanism. In addition, since the kinematic parameters P are compensated or calibrated based on the inversely converted command positions and the corresponding inversely converted actually measured positions which are obtained at every moment, the control is executed in dependence on the present kinematic parameters P which are accurate to cope with the thermal deformations of the mechanism components, so that the positioning can be done precisely. Moreover, since feedback control is executed on the basis of the positions which have been calculated by the use of more accurate, updated kinematic parameters, the controllability (responsiveness) in position control can be remarkably improved, thereby resulting in an advantage that the operational speed and the locus-follow accuracy can be enhanced.

Also in the control method for a three degree of freedom parallel mechanism in the modified form of the foregoing first embodiment typically shown in FIG. 5, since the timing at which the predetermined calibration is performed based on the stored inversely converted command positions and the stored inversely converted actually measured positions is a time when the movable body 30 is not performing the machining of any workpiece, it does not occur that the kinematic parameters P are altered during the machining of one workpiece, so that it can advantageously be realized to prevent any step or other mark caused by the alteration (i.e., compensation) of the kinematic parameters P from being formed on a finish surface of the workpiece.

Also in the control method for a three degree of freedom parallel mechanism in another modified form of the foregoing first embodiment typically shown in FIG. 6, the plural sets of command positions from which the inversely converted command positions are calculated are plural sets of particular positions which are necessary for identification of the kinematic parameters P. In this case, the spindle head 30 is moved to the positions to which it is seldom moved during ordinary machining operations, and the information for identification of the kinematic parameters P are gathered with the spindle head 30 being well-balanced. Therefore, advantages can be attained in that the identification of the kinematic parameters P is enhanced in accuracy or reliability and that the convergence calculations for identification can be made speedily.

Also in the control method for a three degree of freedom parallel mechanism in the foregoing first embodiment typically shown in FIG. 5, since the plural sets of command positions from which the inversely converted command positions are calculated are a plurality of arbitrary positions to which the movable body 30 are positioned during the machining of a workpiece, it becomes possible to identify the kinematic parameters P without making the machine perform particular operations for the identification. Further, an additional advantage can be obtained in that the identification can be carried out to reflect the thermal deformation of the mechanism components during the actual machining of the workpiece.

Also in the control method for a three degree of freedom parallel mechanism in the foregoing first embodiment typically shown in FIG. 5, since the convergence calculations (step S04) are made until errors dP of the kinematic parameters P become less than the predetermined tolerable value $\epsilon$ (step S06), it becomes possible to reliably make the parameter errors dP smaller than the tolerable value $\epsilon$, so that the machining accuracy can advantageously be enhanced.

Also in the control method for a three degree of freedom parallel mechanism parallel mechanism in the foregoing first embodiment typically shown in FIG. 5, the calculation for the kinematic parameters P is carried out in the least squares method based on the inversely converted actually measured positions calculated from the command positions of the number from which the inverse conversion expressions greater in number than the kinematic parameters are obtained. Thus, it can advantageously be attained to derive the correct kinematic parameters P speedily from the command and detected position information which have been gathered redundantly.

Also in the three degree of freedom parallel mechanism in the foregoing first embodiment typically shown in FIGS. 1 and 5, since the three movable body position detectors 45-47 for detecting the coordinate positions of the movable body 30 are arranged at the positions close to the movable body 30, the thermal deformation and the like of the members between the movable body 30 and the position detectors 45-47 hardly cause position detection errors to occur, so that the more accurate position of the movable body 30 can be detected to be used in feedback control. Thus, advantages can be obtained in that not only the positioning control becomes more accurate, but also the identified kinematic parameters P become more accurate. In addition, the provision of the calibration means (step S09) for compensating the old kinematic parameters P makes it possible to execute the feedback control using the more accurate, updated kinematic parameters, whereby it can advantageously be attained that not only the responsiveness (quick-response capability) in control is excellent, but also the operation speed and the locus-follow accuracy are high.

Also in the three degree of freedom parallel mechanism in the foregoing first embodiment typically shown in FIGS. 1 and 5, since the three movable body position detectors 45-47 are arranged at positions closer to the movable body 30 than the positions where the actuator position detectors 41-43 are arranged, it can be realize to detect the more accurate positions on the three axes (Z, A and B) of the movable body 30 and to perform the feedback control using the detected positions, thereby advantageously resulting in improvement in controllability.

Obviously, numerous further modifications and variations of the present invention are possible in light of the above teachings. It is therefore to be understood that within the scope of the appended claims, the present invention may be practiced otherwise than as specifically described herein.

What is claimed is:

1. A three degree of freedom parallel mechanism comprising:
    linear guides secured to a housing and extending with their longitudinal axes in a Z-axis direction;
    a movable body;
    a movable body support structure guided by the linear guides to be movable along the linear guides in the Z-axis direction and supporting the movable body to be pivotable about each of A and B-axes which are respectively defined as two mutually intersecting pivot axes which are transverse with respect to the Z-axis; and
    three actuators connected at their one sides to the housing and at their opposite sides to the movable body respectively through rod-like members, the actuators and the rod-like members configured for moving the movable body support structure along the linear guides and for moving the movable body.

2. The three degree of freedom parallel mechanism as set forth in claim 1, further comprising three movable body position detectors for detecting the position of the movable body, wherein the three movable body position detectors comprise a Z-axis position detector for detecting the position of the movable body along the Z-axis, an A-axis position detector for detecting the orientation of the movable body about the A-axis, and a B-axis position detector for detecting the orientation of the movable body about the B-axis.

3. The three degree of freedom parallel mechanism as set forth in claim 2, wherein the movable body support structure comprises:
    a first movable support member guided along the linear guides in the Z-axis direction; and
    a second movable support member carried on the first movable support member to be pivotable about the A-axis and carrying the movable body to be pivotable about the B-axis.

4. The three degree of freedom parallel mechanism as set forth in claim 3, wherein:
    the Z-axis position detector is a position detector for detecting the position along the Z-axis of the first movable support member;
    the A-axis position detector is a rotary position detector for detecting the pivotal position of the second movable support member; and
    the B-axis position detector is a rotary position detector for detecting the pivotal position of the movable body relative to the second movable support member.

5. The three degree of freedom parallel mechanism as set forth in claim 2, further comprising:
    actuator position detectors for respectively detecting operational positions of the three actuators; and
    feedback control means for performing the feedback control of the three actuators based on information from the three movable body position detectors for detecting the position of the movable body;
    wherein the three movable body position detectors for detecting the position of the movable body are arranged at positions closer to the movable body than the positions where the actuator position detectors are arranged.

6. The three degree of freedom parallel mechanism as set forth in claim 2, wherein:
    the A-axis position detector is arranged on the axis defining the A-axis;
    the B-axis position detector is arranged on the axis defining the B-axis which perpendicularly intersects the axis defining the A-axis;
    the Z-axis position detector is arranged on a surface which includes an intersection point between the axes respectively defining the A-axis and the B-axis and which is perpendicular to the Z-axis direction.

7. The three degree of freedom parallel mechanism as set forth in claim 1, further comprising;
    three drive sliders respectively guided movably along the linear guides;
    three rods interposed as the rod-like members between the three drive sliders and the movable body;
    first and second joints provided at opposite ends of each of the three rods for jointing the three drive sliders with the movable body respectively through the three rods; and wherein:
    the three actuators are linear actuators for respectively moving the three drive sliders along the linear guides; and
    each of one of the first joints and the second joints has two degrees of freedom while each of the other of the first joints and the second joints has three degrees of freedom.

8. The three degree of freedom parallel mechanism as set forth in claim 7, wherein:
    the linear guides comprise three parallel linear guides; and
    the three actuators are provided bodily with the three linear guides for slidably moving the drive sliders along the linear guides.

9. The three degree of freedom parallel mechanism as set forth in claim 7, wherein the movable body support structure comprises:
    a first movable support member guided along the linear guides in the Z-axis direction; and
    a second movable support member carried on the first movable support member to be pivotable about the A-axis and carrying the movable body to be pivotable about the B-axis, and wherein:
    the linear guides comprise three parallel linear guides which are circumferentially arranged at equiangular intervals about an axis parallel to the Z-axis and which extend in the Z-axis direction;
    the first movable support member is an annular member which is secured to three linear sliders respectively guided along the three linear guides;
    the second movable support member is an annular member pivotably carried by a first pair of pivot shafts which are provided to protrude radially inward from the first movable support member; and
    the movable body is a head unit pivotably carried by a second pair of pivot shafts which are provided to protrude radially inward from the second movable support member perpendicularly to the first pair of pivot shafts.

10. The three degree of freedom parallel mechanism as set forth in claim 7, wherein the three linear actuators and the three rods are circumferentially arranged at equiangular intervals about an axis parallel to the Z-axis direction.

11. The three degree of freedom parallel mechanism as set forth in claim 7, wherein:
the joints each having the three degrees of freedom are spherical joints jointing the drive sliders respectively to the rods, while the joints each having the two degrees of freedom are universal joints jointing the rods to the movable body.

12. The three degree of freedom parallel mechanism as set forth in claim 1, wherein the three actuators comprise three telescopic linear actuators, the mechanism further comprising:
three universal joints jointing respective one ends of the three telescopic linear actuators to three portions of the housing; and
three spherical joints jointing respective output ends of the three telescopic linear actuators to the movable body.

13. The three degree of freedom parallel mechanism as set forth in claim 1, wherein the three actuators comprises three rotary actuators secured to three portions of the housing, the mechanism further comprising:
three first link levers secured at respective one ends thereof respectively to output ends of the three rotary actuators;
three universal joints provided at respective other ends of the three first link levers;
three spherical joints provided on the movable body; and
three second link levers jointed at respective one ends thereof to the respective other ends of the three first link levers respectively through the three universal joints and jointed at respective other ends thereof to the movable body respectively through the three spherical joints.

14. A multi-axis numerical control machine tool comprising:
a base;
a work table provided on the base for supporting a workpiece thereon;
a column provided on the base, wherein the work table and the column are relatively movable on the base in an X-axis direction;
a headstock mounted on the column to be movable in a Y-axis direction perpendicular to the X-axis direction;
a spindle head mounted on the headstock;
a tool spindle rotatably supported in the spindle head for receiving a tool in one end thereof;
the three degree of freedom parallel mechanism constructed as set forth in claim 1 and incorporated in the headstock, the parallel mechanism supporting the spindle head to be movable in a Z-axis direction perpendicular to both of the X-axis direction and the Y-axis direction and to be pivotable about each of the A-axis and the B-axis which are respectively defined as the X-axis direction and the Y-axis direction; and
a numerical control device for controlling linear movements of the spindle head relative to the work table in three mutually perpendicular directions including the X-axis direction the Y-axis direction and the Z-axis direction and for controlling pivotal movements of the spindle head relative to the headstock about each of two axes including the A-axis and the B-axis which are respectively defined as the X-axis and the Y-axis;
wherein the headstock and the spindle head are respectively constituted by the housing and the movable body of the three degree of freedom parallel mechanism.

* * * * *